United States Patent [19]
Yokoyama

[11] Patent Number: 5,268,999
[45] Date of Patent: Dec. 7, 1993

[54] MODELING METHOD AND SYSTEM USING SOLID DATA HAVING FUNCTIONAL STRUCTURE AND NORMAL PROJECTION DRAWING DIMENSIONAL FORMAT

[75] Inventor: Terumichi Yokoyama, Tokyo, Japan

[73] Assignee: Ricoh Company, Ltd., Tokyo, Japan

[21] Appl. No.: 859,625

[22] Filed: Mar. 20, 1992

Related U.S. Application Data

[63] Continuation-in-part of Ser. No. 602,378, Oct. 19, 1990, which is a continuation of Ser. No. 533,934, Jun. 5, 1990, abandoned, which is a continuation of Ser. No. 198,477, May 25, 1988, abandoned.

[30] Foreign Application Priority Data

May 30, 1987 [JP] Japan ............................. 62-135618
Jun. 29, 1987 [JP] Japan ............................. 62-162110

[51] Int. Cl.$^5$ ............................................. G06F 15/62
[52] U.S. Cl. ............................. 395/141; 364/474.24; 382/8; 382/16
[58] Field of Search ........... 364/518, 521, 522, 474.05, 364/474.24, 474.25, 474.01; 395/119, 120, 133, 141, 155, 161; 382/8, 9, 16, 25, 28

[56] References Cited

U.S. PATENT DOCUMENTS

| | | | |
|---|---|---|---|
| 3,927,948 | 12/1975 | Cox et al. | 364/512 X |
| 4,181,954 | 1/1980 | Rosenthal et al. | 364/512 X |
| 4,388,610 | 6/1983 | Tsunekawa | 382/8 |
| 4,519,026 | 5/1985 | Nozawa et al. | 364/474.25 |
| 4,530,046 | 7/1985 | Munekata et al. | 364/474.24 X |
| 4,586,145 | 4/1986 | Bracewell et al. | 364/512 |
| 4,618,924 | 10/1986 | Hinds | 364/474.05 X |
| 4,642,754 | 2/1987 | Kishi et al. | 364/474.01 X |
| 4,727,496 | 2/1988 | Ryouki | 364/474.25 X |
| 4,788,636 | 11/1988 | Shiratori et al. | 364/474.25 X |
| 4,792,889 | 12/1988 | Krägelin et al. | 364/474.24 X |
| 4,802,083 | 1/1989 | Isobe et al. | 364/474.24 X |
| 4,933,865 | 6/1990 | Yamamoto et al. | 364/474.24 X |

*Primary Examiner*—Mark K. Zimmerman
*Attorney, Agent, or Firm*—Cooper & Dunham

[57] ABSTRACT

A modeling method for automatically designing an object model carries out the design in two basic steps of conceptual design and detailed design, and constituent element parameters and geometrical element parameters are defined with respect to the conceptual design and the detailed design based on an object material. The constituent element parameters describe the functional structure, that is, the shape and structure of a solid On the other hand, the geometrical element parameters describe the dimension data of the solid.

19 Claims, 11 Drawing Sheets

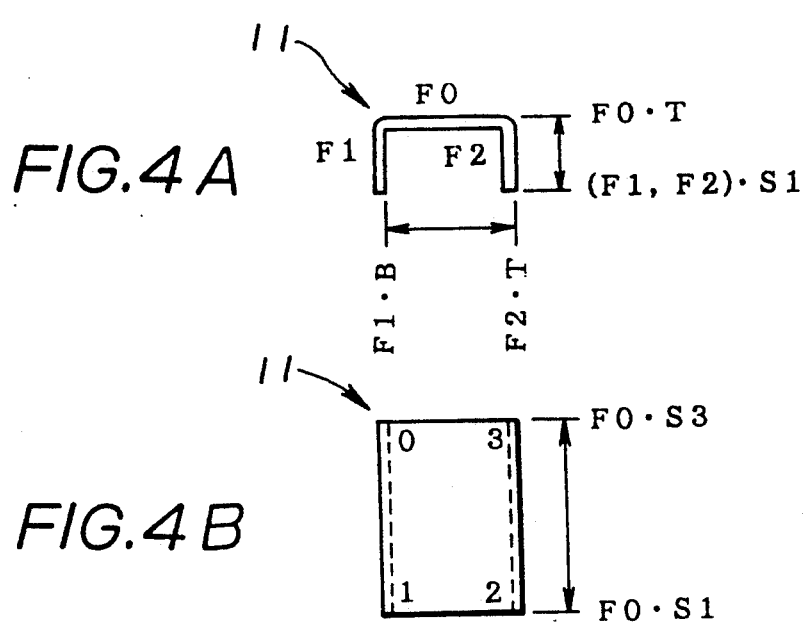
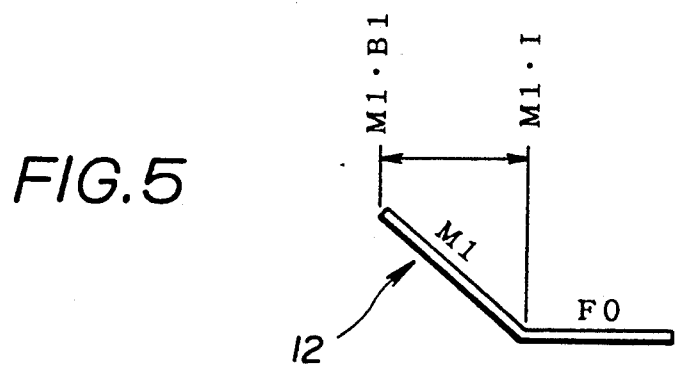
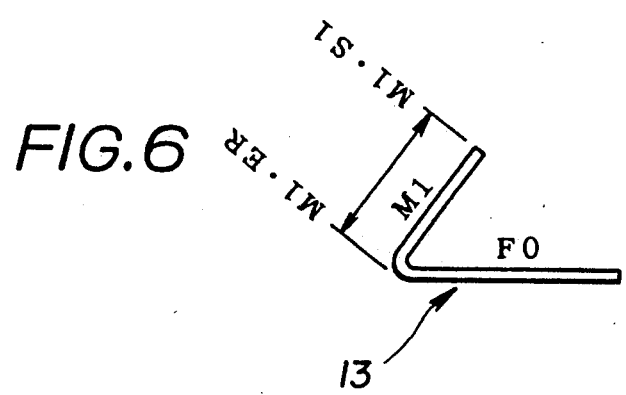

MODELING METHOD AND SYSTEM USING SOLID DATA HAVING FUNCTIONAL STRUCTURE AND NORMAL PROJECTION DRAWING DIMENSIONAL FORMAT

This is a continuation-in-part of application Ser. No. 602,378 filed Oct. 19, 1990, which in turn is a continuation of application Ser. No. 533,934 filed Jun. 5, 1990, now abandoned, which in turn is a continuation of application Ser. No. 198,477 filed May 25, 1988, now abandoned.

BACKGROUND OF THE INVENTION

The present invention generally relates to modeling methods and systems, and more particularly to modeling method and system for automatically designing an object model. An output obtained by the modeling method and system is used for making a design data base, used for generating data of a computer aided manufacturing (CAM), used in a computer aided design (CAD) for making drawings and the like.

The conventional modeling system can roughly be categorized into two types, one being the primitive instancing and the other being the geometrical modeling. According to the primitive instancing, an object model is described as a combination of primitives which are basic shapes so that the primitives do not overlap each other. The geometrical modeling includes the wire frame modeling which describes the object model by use of lines (wires), the face modeling which describes the object model by use of faces, and the solid modeling such as the constructive solid geometry and the boundary representation. According to the geometrical modeling, the basic shapes may overlap each other. For this reason, the degree of freedom with which the object model can be described by the geometrical modeling is considerably improved compared to that of the primitive instancing.

When automatically designing the object model, the degree of freedom of design is required both in the conceptual design in which the general shape and structure of the object model are defined and in the detailed design in which the dimensions of the object model are defined. However, the conventional modeling systems, that is, both the primitive instancing and the geometrical modeling, do not take into account the constituent elements of the object model. Various stages of deformation such as bending and cutting of a sheet metal, for example, cannot be described by the conventional method. In other words, the conventional modeling system does not take into account the material constituting the object model, and the burden is on the person making the design to take into account the material used when employing the geometric modeling, for example. This is because the geometric modeling designs the object model on the assumption that the material used is rigid and no deformation occurs. Since the geometric modeling does not take into account the material used, the automatically designed object model is nor necessarily realizable in actual practice.

Accordingly, the person making the design takes into account the material used when automatically designing the object model, but there is no way of accurately checking by a trial-and-error process how an actual completed model would look like because the person making the design simply assumes certain stages of the deformation of the material used based on his experience. Therefore, the conventional modeling systems suffer problems in that the application thereof is limited to the automatic design of an extremely simple object model in which the material used is neglected. That is, the conventional modeling systems merely give the geometrical description of the object model and not the functional description of the object model.

On the other hand, when entering data on a solid in the CAD system, for example, it is desirable that the data entry can be made efficiently. Conventionally, a coordinate input device such as a tablet is used to enter line segments of normal projections which describe the solid in two dimensions. The line segments entered from the coordinate input device are supplied to a data processing apparatus which analyzes the line segments in accordance with tables containing relationships of the line segments among the normal projections and generates data describing the solid in three dimensions. Such a system is proposed in a Japanese Laid-Open Patent Application No.61-60173, for example.

According to this proposed system, it is possible to more efficiently enter the data on the solid as compared to the case where the three-dimensional coordinates of the solid are directly entered manually from a keyboard or the like. However, when the configuration or structure of the solid is complex, there is a problem in that it takes an extremely long time to enter the line segments of the normal projections. Furthermore, there is also a problem in that it is extremely difficult to distinguish edges when the edges overlap each other in the normal projections. Therefore, from the practical point of view, the efficiency with which the data on the solid are entered still needs to be improved.

SUMMARY OF THE INVENTION

Accordingly, it is a general object of the present invention to provide novel and useful modeling method and system in which the problems described heretofore are eliminated.

Another and more specific object of the present invention is to provide a modeling method for automatically designing an object model in two basic steps of conceptual design and detailed design, and constituent element parameters and geometrical element parameters are defined with respect to the conceptual design and the detailed design based on an object material. According to the modeling method of the present invention, it is possible to describe in a solid model the design concept and judging reference of the person designing the object model. As a result, the degree of freedom of design is greatly improved both in the conceptual design and the detailed design.

Still another object of the present invention is to provide a modeling method for automatically designing an object model in which description data on a solid are entered by entering input image data of a normal projection written with simple alphanumeric sequences and numeric sequences giving functional descriptions of the solid and entering input data giving simple geometrical descriptions (description on the total shape and structure of the solid). According to the modeling method of the present invention, the data on the solid including both the functional descriptions and the geometrical descriptions can be entered efficiently even when the shape and structure of the solid are complex.

A further object of the present invention is to provide a modeling system for automatically designing an object model in which description data on a solid are entered by entering input image data of a normal projection written with simple alphanumeric sequences and numeric sequences giving functional descriptions of the solid and entering input data giving simple geometrical descriptions (description on the total shape and structure of the solid). According to the modeling system of the present invention, the data on the solid including both the functional descriptions and the geometrical descriptions can be entered efficiently even when the shape and structure of the solid are complex.

Other objects and further features of the present invention will be apparent from the following detailed description when read in conjunction with the accompanying drawings.

BRIEF DESCRIPTION OF THE DRAWINGS

FIGS. 4A and 4B are a front view and a plan view respectively showing a solid;

FIGS. 5 and 6 are front views showing different solids;

FIG. 17 is a diagram obtained by eliminating the contour lines shown in FIG. 10B;

FIG. 18 is a process flow chart for explaining an order of processes;

FIG. 19 is a process flow chart for explaining a first dimension line process; and FIG. 20 is a process flow chart for explaining a second dimension line process.

DETAILED DESCRIPTION

Figure 1:
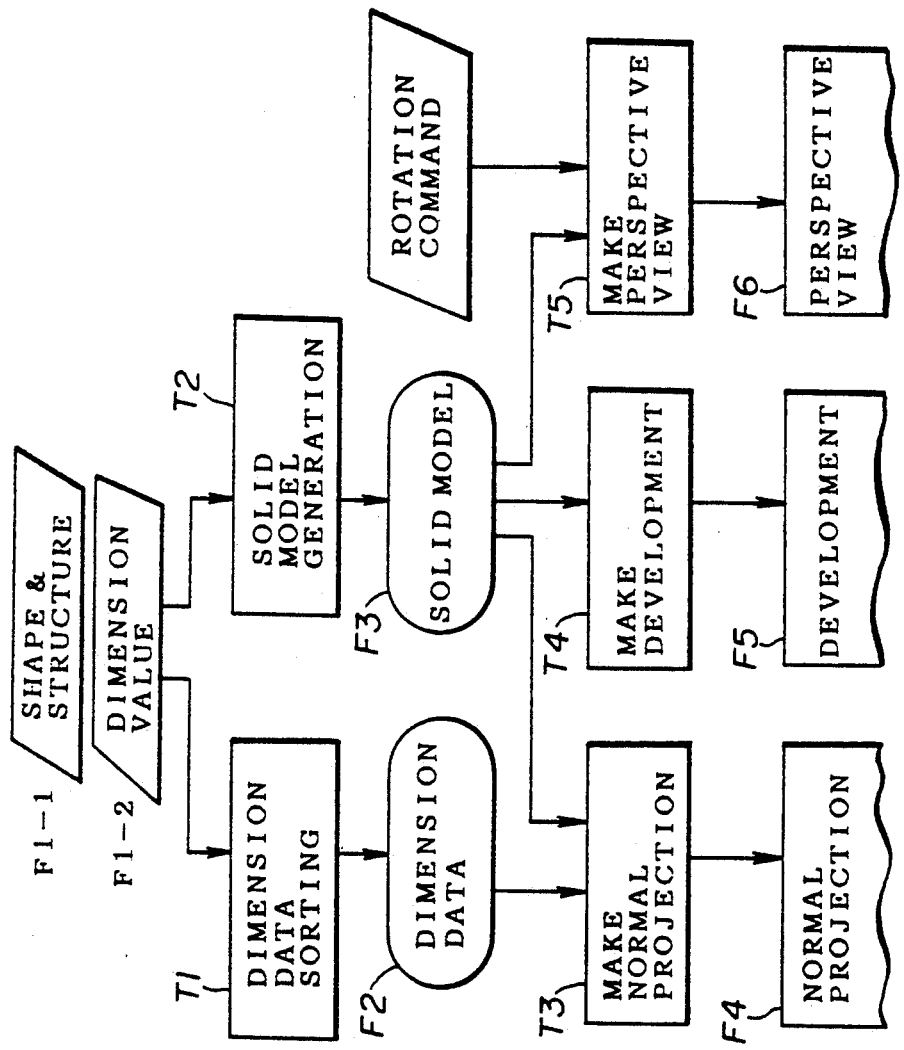
FIG. 1 is a function diagram for explaining the operating principle of a first embodiment of the modeling method according to the present invention.

FIG. 1 shows a function diagram of a first embodiment of the modeling method according to the present invention. In FIG. 1, F with subscripts denote files, and T with subscripts denote processes. A description of files F1-1, F1-2 and F2 through F6 are as follows.

The file F1-1 constitutes a data base and contains data on the shape and structure of a solid. The data in the file F1-1 describes the shape and structure (composition) of the solid, that is, gives a functional description of the solid, by taking unit parts as elements. The file F1-2 constitutes the data base and contains data on the dimension values of the solid. The data in the file F1-2 encodes normal projections by writing pointers to dimension leader lines of the normal projections. The pointer is described in unit face and topological element.

The files F2 and F3 are intermediate files. The file F2 contains data on the dimension data. The dimension data in the file F2 are numbered data on the dimension values which are classified depending on the projection (front, side, etc.) and the dimension line position (top, bottom, right and left of the projection), and the dimension value is described as "(pointer 1); (pointer 2)". The file F3 contains data on the solid model and is described by a map table and a dimensioning table. The map table is a table of the compositions of the object in terms of the unit face. The dimensioning table is a table of three-dimensional positions of vertexes which are a minimum unit of the topological elements.

The files F4 through F6 are output files. The file F4 contains data on the normal projections. The data in the file F4 are described by the projections and dimension line positions designated by the files F1-1 and F1-2. The file F5 contains data on the developments. The data in the file F5 are the development patterns of the object including the development correction of bent portions. The file F6 contains data on the perspective views. The data in the file F6 are projections from arbitrary points of vision and include the complete automatic processing of the hidden outlines.

The "rotation command" in FIG. 1 is not a file but is a key command for designating an arbitrary point of vision.

The modeling method (and system) according to the present invention is not limited to objects made of certain materials. But it is necessary to define the descriptions of the constituent (functional) element parameters and the geometrical (topological) element parameters for each material.

For convenience' sake, the present embodiment will be described for the case where the object is a sheet metal.

In the present embodiment, the constituent element parameters of the sheet metal are described as "unit faces", and the geometrical element parameters are described as "topological elements". The constituent element parameters describe the object model in parts with reference to the shapes and connections thereof. The following Table 1 gives the label name and definition of the unit faces.

TABLE 1

| Unit Face | Label Name | Definition |
|---|---|---|
| First Defined Face | F0 | First real face |
| Flange | Fn | An added face which stems from one side of a reference face for the entire length of the side |
| Tongue | Mn | An added face which stems from one side of a reference face for a partial length of the side |
| Cutout | Cn | An eliminated portion cut from one side of a reference face for a partial length of the side |
| Hole | An | A cut and eliminated face included in a reference face |

In Table 1, a unit face refers to a part, a real face refers to a plane (or first degree curve), a reference face refers to an originating unit face, and n is a consecutive number assigned to each kind of unit face (n=1, 2, ..., n).

Figure 2:
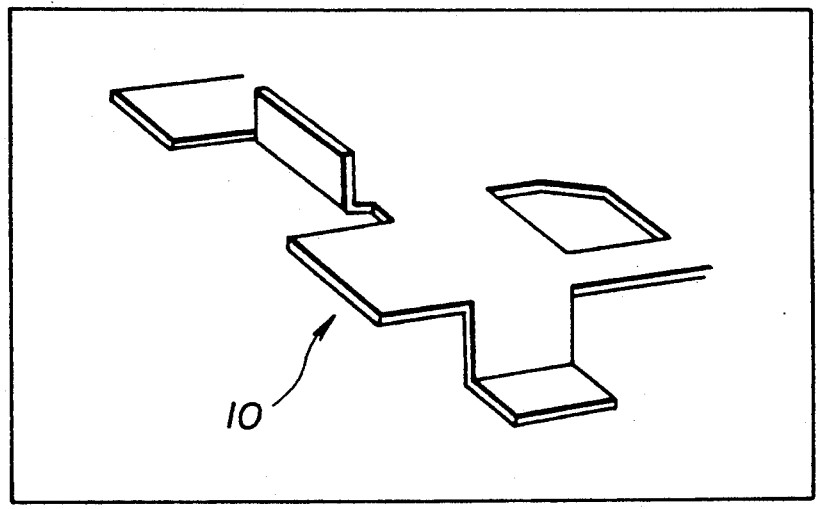
FIG. 2 is a perspective view showing a solid.
Figure 3:
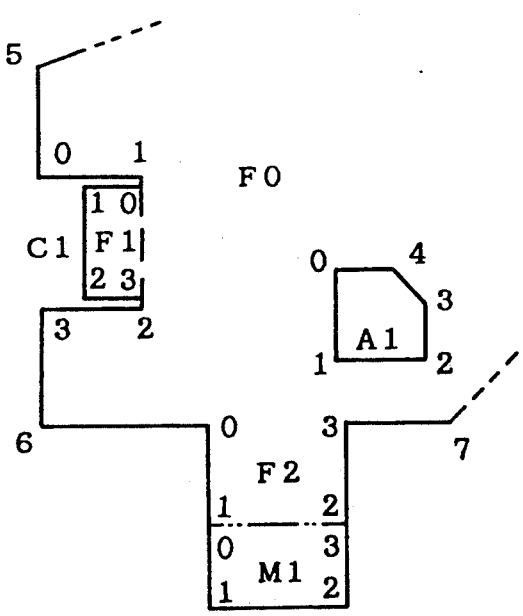
FIG. 3 shows a development of the solid shown in FIG. 2.

FIG. 2 shows a perspective view of a solid 10 which is to be subjected to the automatic designing in the present embodiment. The solid 10 may be developed as shown in FIG. 3, and each part of the solid 10 in the development may be considered as unit faces. Hence, the development shown in FIG. 3 can be described as follows.

F0(m)

C1=F0.5

F1=C1.1

F2>M1=F0.6

A1(4)=F0

The numeral subscript of the label name is assigned to each vertex of the first defined face, the flange and the tongue by starting the numbering from "0" in a counter-clockwise sequence. A number in brackets after the numeral subscript of the label name indicates a maximum number of the vertexes minus one. However, the indication in brackets will be omitted when the maximum number of vertexes minus one is "3", that is, when the unit face is rectangular. On the other hand, the numeral subscript of the label name is assigned to each vertex or corner of the cutout by starting from "0" in a clockwise sequence.

Therefore, F0(m) means that a first defined face F0 has m+1 vertexes. C1=F0.5 means that a cutout C1 is formed in the first defined face F0 in a portion of a side number "5-6" between the vertex numbers "5" and "6" of the first defined face F0, but the indication of the vertex number "6" is omitted because the numbers of the vertexes are assigned in a sequence. F1=C1.1 means that a flange F1 stems from the cutout C1 from the full length of a side between the vertex numbers "1" and "2" of the cutout C1. F2>M1=F0.6 means that a tongue M1 stems from a portion of the first defined face F0 from a side between the vertex numbers "6" and "7" of the first defined face F0 and that a flange F2 stems from the first defined face F0 and is an integral portion of the tongue M1. A1(4)=F0 means that a hole A1 having five (4+1) vertexes or corners is formed in the first defined face F0.

The geometrical element parameters are written in vicinities of the dimension leader lines of the normal projections. The following Table 2 gives the label name and definition of the topological elements. In Table 2, n=0, 1, ..., n.

TABLE 2

| Topological Element | Label Name | Description |
|---|---|---|
| Top surface | T | Top surface |
| Bottom surface | B | Bottom surface |
| Top edge | Tn | Straight edge |
|  | TRn | Rounded edge |
| Bottom edge | Bn | Straight edge |
|  | BRn | Rounded edge |
| Side edge | Sn | Straight side edge |
|  | SRn | Rounded side edge |
| Bent inner edge | I | Inner edge of a bent portion |
| Bent outer edge | ER | Rounded outer edge of a bent portion |
| Plot number | n | Vertex, corner, point assigned from "0" |
| Hole position | Hn | Position of center of |

TABLE 2-continued

| Topological Element | Label Name | Description |
|---|---|---|
|  |  | hole |

Next, a description will be given on the writing of the topological elements in the vicinities of the dimension leader lines by referring to FIGS. 4A and 4B, and 5 through 8.

FIG. 4A shows a front view of a solid 11 and FIG. 4B shows a plan view of the solid 11. The unit faces are defined similarly as described before, and the topological elements are written in the vicinities of the dimension leader lines as shown as alphanumeric sequences. The topological element corresponding to the dimension leader line from the top surface of the first defined face F0 is described by the alphanumeric sequence F0.T which indicates that the topological element is the top surface of the first defined face F0. The other topological elements are written similarly in the vicinities of the respective dimension leader lines. For example, F0.S3 indicates a side edge between the vertex numbers "3" and "0" of the first defined face F0. (F1, F2).S1 indicates a side edge of each of the flanges F1 and F2 between the vertex numbers "1" and "2" of the first defined face F0. F1.B indicates a bottom surface of the flange F1.

FIG. 5 shows a front view of a solid 12. The unit faces are defined similarly as described before, and the topological elements are written in the vicinities of the dimension leader lines as shown as alphanumeric sequences. For example, M1.B1 indicates a straight bottom edge of the tongue M1 between the vertex numbers "0" and "1". M1.I indicates an inner edge of a bent portion of the tongue M1.

FIG. 6 shows a front view of a solid 13. The unit faces and the topological elements are defined similarly as described before. For example, M1.ER indicates a rounded outer edge of a bent portion of the tongue M1.

Figure 7:
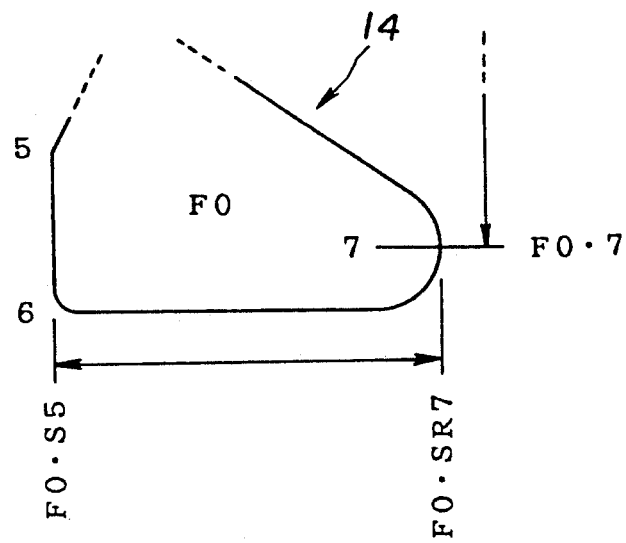
FIGS. 7 and 8 are plan views showing different solids.

FIG. 7 shows a plan view of a solid 14. For example, F0.SR7 indicates a rounded side edge of the first defined face F0 at the vertex number "7".

Figure 8:
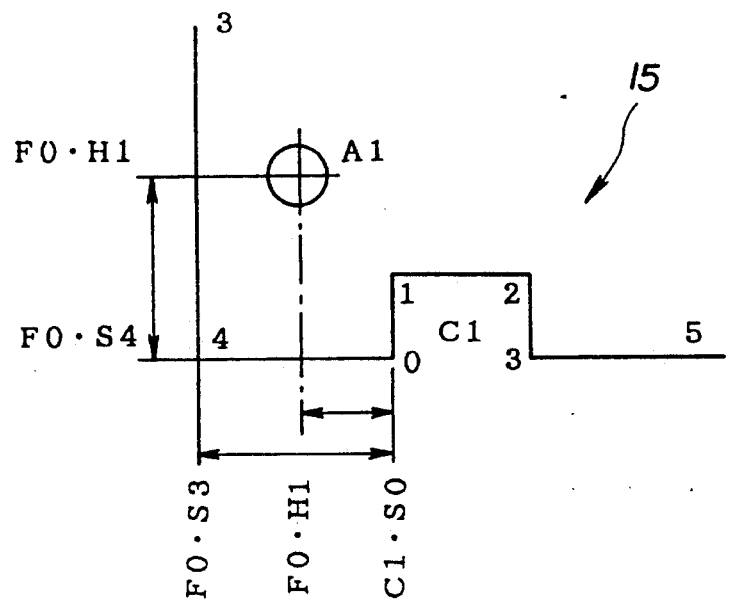

FIG. 8 shows a plan view of a solid 15. For example, F0.H1 indicates the position of the hole A1 in the first defined face F0. C1.S0 indicates a straight side edge of the cutout C1 between the vertex or corner numbers "0" and "1" of the cutout C1.

The files F1-1 and F1-2 shown in FIG. 1 are input files respectively having the unit face and the topological element as key words, that is, description elements. Next, a description will be given on the description format of the files F1-1 and F1-2. In the present specification, the description format of the file F1-1 for describing the unit faces will be referred to as "mapping". On the other hand, the description format of the file F1-2 for describing the topological elements will be referred to as "dimensioning".

The mapping involves the following. That is, the developed image of the single sheet metal (neglecting the bends) is described as connections of unit faces. The description format of each unit face is shown in the following Table 3. In Table 3, the default value of m is "3", that is, a rectangle. The unit face which becomes the first defined face may include cutouts and holes, and the object model is described as unit faces connected to the first defined face and including cuts and bends.

TABLE 3

| | |
|---|---|
| Main Face: | [F0(m)] |
| Flange: | Fn[(m)] = (Main Face No.).(Side No.) |
| Continuous | Fn>Fn+1> ... Fk[(m)] |
| Bend: | (Main Face No.).(Side No.) |
| Tongue: | Mn[(m)] = (Main Face No.).(Side No.) |
| Cutout: | Cn[(m)] = (Main Face No.).(Side No.) |
| Hole: | An[(m)] = Main Face No. |

The dimensioning involves the following. That is, the dimension data of the normal projections are encoded. The basic format of the dimensioning is shown in the following Table 4. In Table 4, pN denotes a pointer with respect to the dimension leader line and is described by the unit number and topological element, and dN denotes a distance or an angle and is described by a numerical value or a defined part name.

TABLE 4

| |
|---|
| p1; p2; ... ; pN = d1; d2; ... ; dN-1 |

Figure 9:
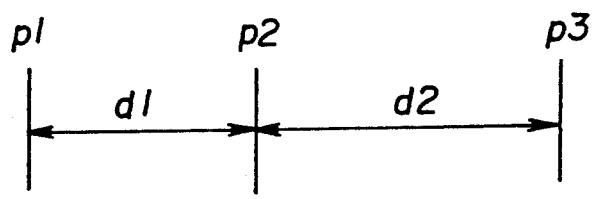
FIG. 9 is a diagram for explaining the dimensioning.

For example, a distance d1 between p1 and p2 in FIG. 9 is described as p1; p2=d1. Similarly, a distance (d1+d2) between p1 and p3 is described as p1; p2; p3=d1; d2.

The dimension (X, Y, Z) of the dimension data is determined by the projection plane (front/rear, top/bottom and right/left) and the dimension leader line position (north/south/east/west). The format of the dimension is shown in the following Table 5, where the projection planes are respectively denoted by FRT, BCK, TOP, BOT, RGT and LFT for the front, back, top, bottom, right and left projections, and the dimension leader line positions are respectively denoted by N, S, E and W for the north, south, east and west positions.

TABLE 5

| |
|---|
| (Projection plane) · (Dimension leader line position) |

Figure 10A:
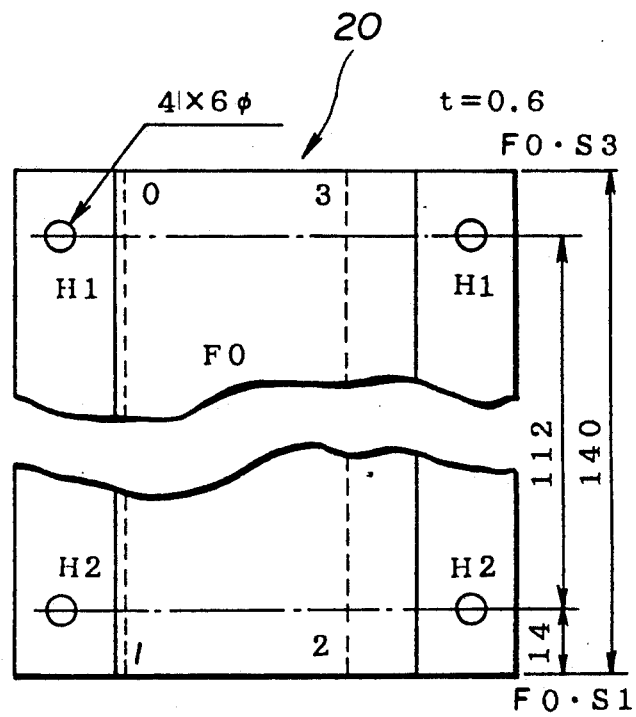
FIGS. 10A and 10B are a front view and a bottom view respectively showing a solid for explaining the mapping and dimensioning.
Figure 10B:
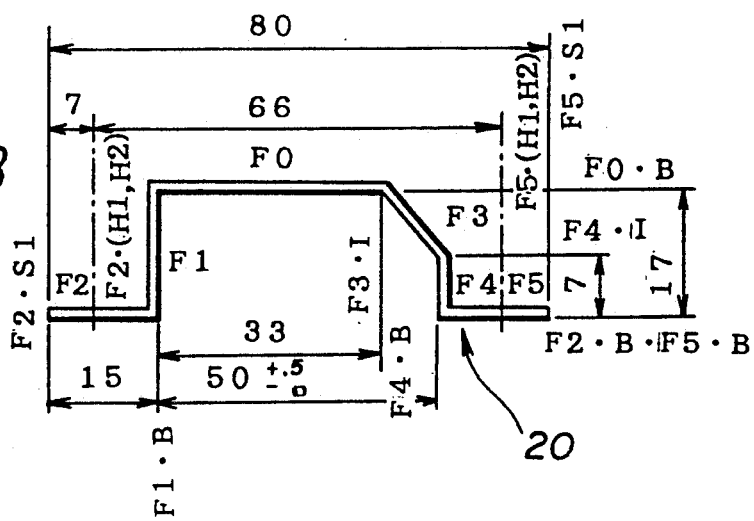

FIGS. 10A and 10B respectively show a front view and a bottom view of a solid 20. The following Table 6 shows the mapping and dimensioning with respect to the solid 20. In Table 6, MAP denotes the mapping description and DIM denotes the dimensioning description.

TABLE 6

| | |
|---|---|
| MAP | Solid 20<br>F1 > F2 = F0.0<br>F3 > F4 > F5 = F0.2 |
| DIM | FRT.E<br>140 = F0.(S3; S1)<br>112; 14 = (F2, F5).(H1; H2); *<br>FRT.P<br>@4_HOLE(6) = (F2, F5).(H1, H2)<br>BOT.N<br>80 = F2.S1; F5.S1<br>7; 66 = *; (F2, F5).(H1, H2)<br>BOT.S<br>15; 50@.5., 0 = *; F1.B; F4.B<br>33 = F1.B; F3.IR<br>BOT.E<br>17 = F0.B; (F2, F5).B<br>7 = F4.IR; *<br>Solid XX |

For example, in the mapping description MAP shown in Table 7, F1>F2=F0.0 at the first line means that the flange F1 stems from the side "0" between the vertex numbers "0" and "1" of the first defined face F0 and the flange F2 stems from the flange F1.

For example, in the dimensioning description DIM shown in Table 7, FRT.E at the first line means the east dimension leader line position of the front projection. 140=F0.(S3; S1) at the second line means that a distance between F0.S3 and F0.S1 is 140. 112; 14=(F2, F5).(H1; H2); * means that a distance between F2.H1 and F2.H2 is 112, a distance between F5.H1 and F5.H2 is 112, a distance between F2.H2 and F0.S1 is 14, and a distance between F5.H2 and F0.S1 is 14. The symbol ";*" indicates that the term on the right hand side of ";" is the same as the term on the right hand side of ";" of the immediately preceding line. FRT.P means the pattern (or comment) on the front projection. @4_HO-LE(6)=(F2, F5).(H1, H2) means that four holes of diameter 6 are provided at the positions F2.H1, F2.H2, F5.H1 and F5.H2. The description of the remaining lines of the dimensioning description DIM will be omitted. At the tenth line, "5., 0" means the margins of +5 and −0. The mapping description and the dimensioning description for a following solid XX starts after the dimensioning description DIM for the solid 20.

The file F1-1 containing the mapping description MAP and the file F1-2 containing the dimensioning description DIM are converted into intermediate files in the respective processes T1 and T2 shown in FIG. 1. The following Table 7 shows a three-dimensional array of the intermediate file obtained from the file F1-1 and the following Table 8 shows dimension data of the intermediate file obtained from the file F1-2 which are obtained by carrying out the process T1 shown in FIG. 1.

TABLE 7

| | | | |
|---|---|---|---|
| X | | | |
| 0 | 0 | 0.00 | F2.S1 |
| 1 | 0 | 7.00 | F2.H1.F2.H2 |
| 2 | 0 | 15.00 | F1.B |
| 3 | 0 | 48.00 | F3.IR |
| 4 | 0 | 65.00 | F4.B |
| 5 | 0 | 73.00 | F5.H1.F5.H2 |
| 6 | 0 | 80.00 | F5.S1 |
| Y | | | |
| 0 | 0 | 0.00 | F0.S3 |
| 1 | 0 | 14.00 | F2.H1.F5.H1 |
| 2 | 0 | 126.00 | F2.H2.F5.H2 |
| 3 | 0 | 140.00 | F0.S1 |
| Z | | | |
| 0 | 0 | 0.00 | F0.B |
| 1 | 0 | 10.00 | F4.IR |
| 2 | 0 | 17.00 | F2.B.F5.B |

TABLE 8

| Projection/<br>Direction | Pointers/<br>Values |
|---|---|
| 1 10/21 | F2.H1.F5.H1; F2.H2.F5.H2; F0.S1/112; 14 |
| 2 10/21 | F0.S3; F0.S1/140 |
| 3 10/0 | F2.H1.F5.H1.F2.H2.F5.H2/@4_HOLE(6) |
| 4 21/10 | F2.S1; F2.H1.F2.H2; F5.H1.F5.H2/7; 66 |
| 5 21/10 | F2.S1; F5.S1/80 |
| 6 21/11 | F1.B; F3.IR/33 |
| 7 21/11 | F2.S1; F1.B; F4.B/15; 50@.5.,0 |
| 8 21/21 | F4.IR; F2.B.F5.B/7 |
| 9 21/21 | F0.B; F2.B.F5.B/17 |

The three-dimensional array shown in Table 7 is obtained by sorting the X, Y and Z coordinates of each of the pointers based on dimensioning description DIM of the input file F1-2 in a sequence depending on the size of the dimension values. The dimension data shown in Table 8 and contained in the file F2 is a table of dimension data (dimension leader lines and dimension values) of the normal projections for the output file F4. The process T3 is a normal projection drawing routine which draws the dimension data based on the intermediate file F2.

The file F3 obtained by the process T2 contains the topological (solid model) description made up of three kinds of tables, that is, the mapping table, the dimensioning table (three-dimensional positions of topological elements) and a hole table. The following Tables 9, 10 and 11 show the definition of codes used in the map table, the dimensioning table and the hole table, respectively.

TABLE 9

| | |
|---|---|
| arg: | Line no. of mapping table and equal to total no. of unit faces |

TABLE 10

| | |
|---|---|
| e#: | arg (line no.) of dimensioning table and simultaneously describes vertex no. |
| sb: | Unit face no. when a sub-face stems from an edge (e# to e+1#), and 0 when no stemming |
| X: | X-component of top vertex/X-component of bottom vertex |
| Y: | Y-component of top vertex/Y-component of bottom vertex |
| Z: | Z-component of top vertex/Z-component of bottom vertex |
| nx: | X-component of normal vector of a side surface (e to e+1) |
| ny: | Y-component of normal vector of a side surface (e to e+1) |
| nz: | Z-component of normal vector of a side surface (e to e+1) |

TABLE 11

| | |
|---|---|
| m-f: | arg of unit face which becomes first defined face |
| n-n: | Hole no. |
| X: | X-component of center position of hole |
| Y: | Y-component of center position of hole |
| Z: | Z-component of center position of hole |
| pattern: | Pattern name of registered hole |

The solid model in the file F3 obtained by the process T2 is made up of the three kinds of tables, that is, Tables 12 through 14. Table 12 shows the mapping table which registers the unit faces, Table 13 shows the dimensioning table which contains the three-dimensional position data of each vertex of the registered unit faces, and Table 14 shows the hole table which contains the three-dimensional position data and hole name other than the unit faces. The solid model is not a permanent data base but is a transaction data of only the object parts to the outputted. The solid model is generated every time the object model is modified, and the person designing the object model can easily make the modifications in the normal projections. Table 13 is divided into Tables 13A and 13B due to space limitation.

TABLE 12

| arg | fc | f# | pn | bf# | be# | pin | nx | ny | nz | bnd | sbf | me# |
|---|---|---|---|---|---|---|---|---|---|---|---|---|
| 0— | 0 | 0 | 3 | 0 | 0 | 0 | 0.00 | 0.00 | 1.00 | 0 | 2 | 0 |
| 1— | 0 | 1 | 3 | 0 | 0 | 4 | −1.00 | 0.00 | 0.00 | 1 | 1 | 0 |
| 2— | 0 | 2 | 3 | 1 | 1 | 8 | 0.00 | 0.00 | 1.00 | −1 | 0 | 5 |
| 3— | 0 | 3 | 3 | 0 | 2 | 12 | 0.51 | 0.00 | 0.86 | 1 | 1 | 2 |
| 4— | 0 | 4 | 3 | 3 | 1 | 16 | 1.00 | 0.00 | 0.00 | 1 | 1 | 13 |
| 5— | 0 | 5 | 3 | 4 | 1 | 20 | 0.00 | 0.00 | 1.00 | −1 | 0 | 17 | fc: Code for the kind of unit face (0/flange, 1/tongue, 2/cutout, 3/hole)
f#: Unit face no.
pn: Plot (vertex) no. of each unit face
bf#: arg of first defined face
be#: main side no.
pin: pointer for dimensioning table
nx: X-component of normal vector of surface of each unit face
ny: Y-component of normal vector of surface of each unit face
nz: Z-component of normal vector of surface of each unit face
bnd: Direction of bend with respect to first defined face (downward bend/upward bend = 1/−1)
sbf: Total no. of sub-faces stemming from each unit face
me#: Main side no. indicated by arg of dimensioning table

TABLE 13A

| e# sb | x | y | z |
|---|---|---|---|
| 0-1 | 15.00/15.00 | 0.00/0.00 | 0.60/0.00 |
| 1-0 | 15.00/15.00 | −140.00/−140.00 | 0.60/0.00 |
| 2-3 | 48.00/48.00 | −140.00/−140.00 | 0.60/0.00 |
| 3-0 | 48.00/48.00 | 0.00/0.00 | 0.60/0.00 |
| 4-0 | 14.40/15.00 | 0.00/0.00 | 0.00/0.00 |
| 5-2 | 14.40/15.00 | 0.00/0.00 | −16.40/−16.40 |
| 6-0 | 14.40/15.00 | −140.00/−140.00 | −16.40/−16.40 |
| 7-0 | 14.40/15.00 | −140.00/−140.00 | 0.00/0.00 |
| 8-0 | 14.40/14.40 | 0.00/0.00 | −16.40/−17.00 |
| 9-0 | 0.00/0.00 | 0.00/0.00 | −16.40/−17.00 |
| 10-0 | 0.00/0.00 | −140.00/−140.00 | −16.40/−17.00 |
| 11-0 | 14.40/14.40 | −140.00/−140.00 | −16.40/−17.00 |
| 12-0 | 48.30/48.00 | −140.00/−140.00 | 0.52/−0.00 |
| 13-4 | 65.30/65.00 | −140.00/−140.00 | −9.48/−10.00 |
| 14-0 | 65.30/65.00 | 0.00/0.00 | −9.48/−10.00 |
| 15-0 | 48.30/48.00 | 0.00/0.00 | 0.52/−0.00 |
| 16-0 | 65.60/65.00 | −140.00/−140.00 | −10.00/−10.00 |
| 17-5 | 65.60/65.00 | −140.00/−140.00 | −16.40/−16.40 |
| 18-0 | 65.60/65.00 | 0.00/0.00 | −16.40/−16.40 |
| 19-0 | 65.60/65.00 | 0.00/0.00 | −10.00/−10.00 |
| 20-0 | 65.60/65.60 | −140.00/−140.00 | −16.40/−17.00 |
| 21-0 | 80.00/80.00 | −140.00/−140.00 | −16.40/−17.00 |
| 22-0 | 80.00/80.00 | 0.00/0.00 | −16.40/−17.00 |
| 23-0 | 65.60/65.60 | 0.00/0.00 | −16.40/−17.00 |

TABLE 13B

| e# sb | nx | ny | nz |
|---|---|---|---|
| 0-1 | −1.00 | 0.00 | 0.00 |
| 1-0 | 0.00 | −1.00 | 0.00 |
| 2-3 | 1.00 | −0.00 | 0.00 |
| 3-0 | 0.00 | 1.00 | 0.00 |
| 4-0 | 0.00 | 1.00 | 0.00 |
| 5-2 | −0.00 | 0.00 | −1.00 |
| 6-0 | 0.00 | −1.00 | 0.00 |
| 7-0 | 0.00 | 0.00 | 1.00 |
| 8-0 | 0.00 | 1.00 | 0.00 |
| 9-0 | −1.00 | 0.00 | 0.00 |
| 10-0 | 0.00 | −1.00 | 0.00 |
| 11-0 | 1.00 | −0.00 | 0.00 |
| 12-0 | 0.00 | −1.00 | 0.00 |
| 13-4 | 0.86 | 0.00 | −0.51 |
| 14-0 | 0.00 | 1.00 | 0.00 |
| 15-0 | −0.86 | −0.00 | 0.51 |

TABLE 13B-continued

| e# sb | nx | ny | nz |
|---|---|---|---|
| 16-0 | 0.00 | −1.00 | 0.00 |
| 17-5 | 0.00 | 0.00 | −1.00 |
| 18-0 | 0.00 | 1.00 | 0.00 |
| 19-0 | 0.00 | 0.00 | 1.00 |
| 20-0 | 0.00 | −1.00 | 0.00 |
| 21-0 | 1.00 | 0.00 | 0.00 |
| 22-0 | 0.00 | 1.00 | 0.00 |
| 23-0 | −1.00 | −0.00 | 0.00 |

TABLE 14

| m-f | n-n | X | Y | Z | Pattern |
|---|---|---|---|---|---|
| 2− | 1 | 7.00 | −14.00 | 0.00 | HOLE(6) |
| 5− | 1 | 73.00 | −14.00 | 0.00 | HOLE(6) |
| 2− | 2 | 7.00 | −126.00 | 0.00 | HOLE(6) |
| 5− | 2 | 73.00 | −126.00 | 0.00 | HOLE(6) |

The rotated solid data of the solid model obtained by modifying the dimension values, that is, rotating the file F3 are shown in the following Tables 15 and 16. Table 16 is divided into Tables 16A and 16B due to space limitation.

TABLE 15

| arg | fc | f# | pn | bf# | be# | pin | nx | ny | nz | bnd | sbf | me# |
|---|---|---|---|---|---|---|---|---|---|---|---|---|
| 0− | 0 | 0 | 3 | 0 | 0 | 0 | −0.09 | 0.71 | 0.71 | 0 | 2 | 0 |
| 1− | 0 | 1 | 3 | 0 | 0 | 4 | −0.41 | −0.66 | 0.47 | 1 | 1 | 0 |
| 2− | 0 | 2 | 3 | 1 | 1 | 8 | −0.09 | 0.71 | 0.71 | −1 | 0 | 5 |
| 3− | 0 | 3 | 3 | 0 | 2 | 12 | 0.13 | 0.95 | 0.37 | 1 | 1 | 2 |
| 4− | 0 | 4 | 3 | 3 | 1 | 16 | 0.41 | 0.66 | −0.47 | 1 | 1 | 13 |
| 5− | 0 | 5 | 3 | 4 | 1 | 20 | −0.09 | 0.71 | 0.71 | −1 | 0 | 17 |

TABLE 16A

| e# sb | x | y | z |
|---|---|---|---|
| 0-1 | −121.02/−120.97 | −106.21/−106.64 | −47.44/−47.86 |
| 1-0 | 6.13/6.19 | −137.93/−138.36 | −1.68/−2.10 |
| 2-3 | 19.62/19.67 | −116.10/−116.53 | −17.04/−17.47 |
| 3-0 | −107.54/−107.48 | −84.38/−84.81 | −62.80/−63.23 |
| 4-0 | −121.21/−120.97 | −107.04/−106.64 | −47.59/−47.86 |
| 5-2 | −119.73/−119.49 | −118.76/−118.37 | −59.19/−59.47 |
| 6-0 | 7.42/7.67 | −150.48/−150.08 | −13.43/−13.71 |
| 7−0 | 5.94/6.19 | −138.76/−138.36 | −1.82/−2.10 |
| 8-0 | −119.73/−119.68 | −118.76/−119.19 | −59.19/−59.62 |
| 9-0 | −125.61/−125.56 | −128.29/−128.72 | −52.49/−52.92 |
| 10-0 | 1.54/1.59 | −160.01/−160.44 | −6.73/−7.15 |
| 11-0 | 7.42/7.48 | −150.48/−150.91 | −13.43/−13.86 |
| 12-0 | 19.75/19.67 | −115.96/−116.53 | −17.24/−17.47 |
| 13-4 | 27.60/27.52 | −111.86/−112.43 | −32.23/−32.46 |
| 14-0 | −99.56/−99.63 | −80.14/−80.71 | −78.00/−78.22 |
| 15-0 | −107.41/−107.48 | −84.24/−84.81 | −63.00/−63.23 |
| 16-0 | 27.76/27.52 | −112.03/−112.43 | −32.74/−32.46 |
| 17-5 | 28.34/28.10 | −116.61/−117.00 | −37.27/−36.99 |
| 18-0 | −98.81/−99.06 | −84.89/−85.28 | −83.03/−82.75 |
| 19-0 | −99.39/−99.63 | −80.31/−80.71 | −78.50/−78.22 |
| 20-0 | 28.34/28.40 | −116.61/−117.04 | −37.27/−27.69 |
| 21-0 | 34.23/34.28 | −107.08/−107.51 | −43.97/−44.40 |
| 22-0 | −92.93/−92.87 | −75.36/−75.79 | −89.73/−90.16 |
| 23-0 | −98.81/−98.76 | −84.89/−85.32 | −83.03/−83.46 |

TABLE 16B

| e# sb | nx | ny | nz |
|---|---|---|---|
| 0-1 | −0.41 | −0.66 | 0.47 |
| 1-0 | 0.91 | −0.23 | 0.33 |
| 2−3 | 0.41 | 0.66 | −0.47 |
| 3-0 | −0.91 | 0.23 | −0.33 |
| 4-0 | −0.91 | 0.23 | −0.33 |
| 5-2 | 0.09 | −0.71 | −0.71 |
| 6-0 | 0.91 | −0.23 | 0.33 |
| 7−0 | −0.09 | 0.71 | 0.71 |
| 8-0 | −0.91 | 0.23 | −0.33 |
| 9-0 | −0.41 | −0.66 | 0.47 |
| 10-0 | 0.91 | −0.23 | 0.33 |
| 11-0 | 0.41 | 0.66 | −0.47 |
| 12-0 | 0.91 | −0.23 | 0.33 |
| 13-4 | 0.40 | 0.21 | −0.76 |
| 14-0 | −0.91 | 0.23 | −0.33 |
| 15-0 | −0.40 | −0.21 | 0.76 |
| 16-0 | 0.91 | −0.23 | 0.33 |
| 17-5 | 0.09 | −0.71 | −0.71 |
| 18-0 | −0.91 | 0.23 | −0.33 |
| 19-0 | −0.09 | 0.71 | 0.71 |
| 20-0 | 0.91 | −0.23 | 0.33 |
| 21-0 | 0.41 | 0.66 | −0.47 |
| 22-0 | −0.91 | 0.23 | −0.33 |
| 23-0 | −0.41 | −0.66 | 0.47 |

Figure 11:
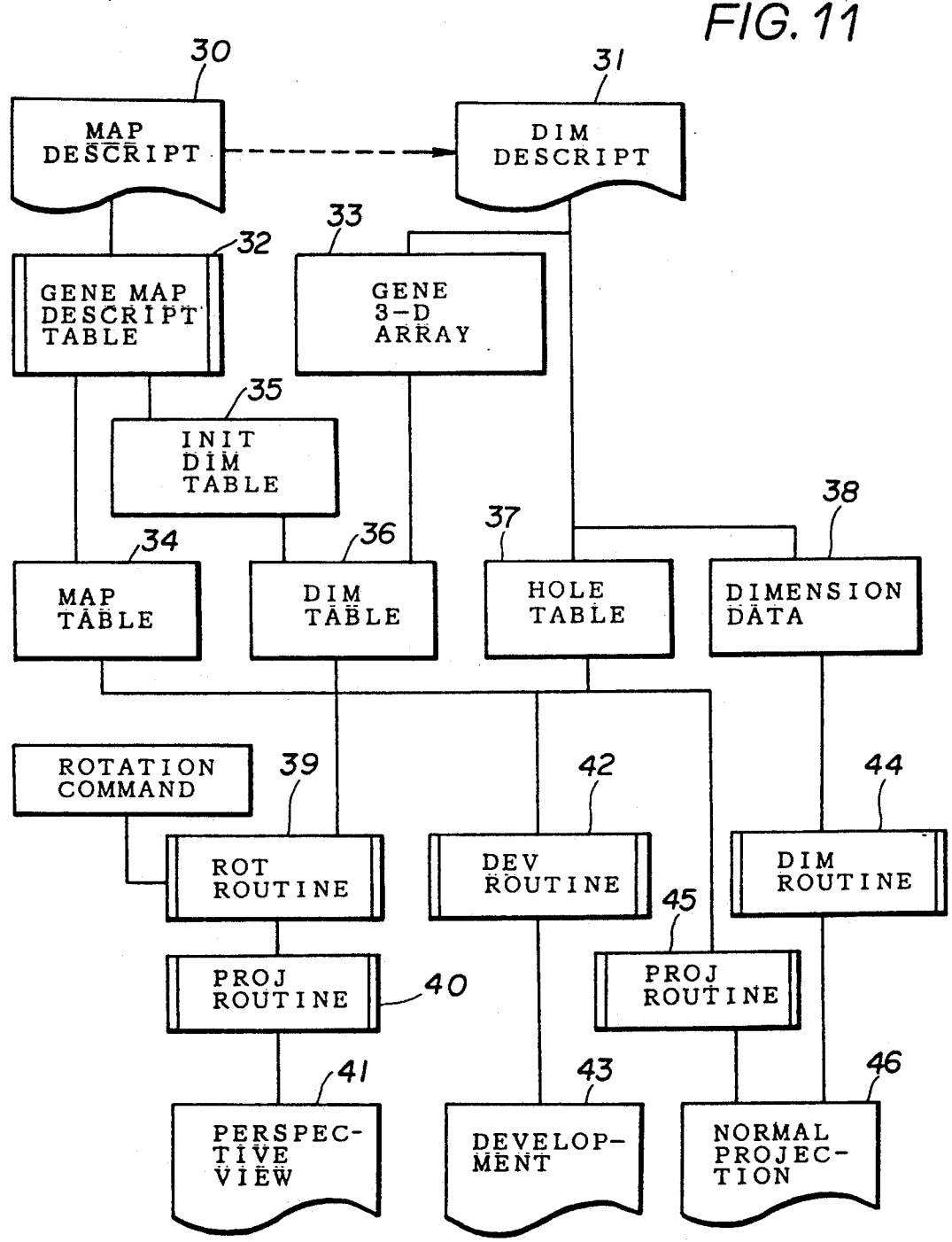
FIG. 11 is a process flow chart for explaining the processes of the first embodiment of the modeling method.

FIG. 11 shows a process flow chart of the first embodiment of the modeling method. A mapping description 30 and a dimensioning description 31 correspond to the mapping description MAP and dimensioning description DIM of Table 6 and are modeling descriptions. A step 32 makes a mapping description table from the mapping description 30, and a step 33 makes a three-dimensional array from the dimensioning description 31. The three-dimensional array made in the step 33 corresponds to the three-dimensional array of Table 7. A step 34 makes a mapping table of the solid model from the mapping description table obtained at the step 32. A step 36 makes a dimensioning table of the solid model from the mapping description table obtained at the step 32 and the three-dimensional array obtained at the step 33. A step 35 is used to initialize the dimensioning table. A step 37 makes a hole table of the the solid model from the dimensioning description 31. The map table, the dimensioning table and the hole table obtained at the steps 34, 36 and 37 correspond respectively to the mapping, dimensioning and hole tables of Tables 12, 13 and 14. In other words, the solid data are obtained from the steps 34, 36 and 37. A step 38 makes the dimension data from the dimensioning description 31. The dimension data obtained at the step 38 corresponds to the dimension data of Table 8.

Steps 39 and 40 respectively carry out a rotation routine and a projection routine on the solid data from the steps 34, 36 and 37, and a perspective view is obtained at a step 41. The rotation routine is carried out in the step 39 responsive to a rotation command. A step 42 carries out a development routine on the solid data, and a development is obtained at a step 43. A step 44 carries out a dimensioning routine on the dimension data from the step 38, and a step 45 carries out a projection routine on the solid data, thereby obtaining a normal projection in a step 46.

The processes shown in FIG. 11 can be carried out by a processing program written in the C-language (Lattice-C) with approximately 1 Mbytes (OBJ). Any hardware may be used, but it is necessary that the hardware includes a drawing function such as cathode ray tube (CRT) and a plotter.

According to the present embodiment, the processing program is basically made up of two kinds of programs, one being an analysis program for carrying out the conversion from the modeling description to the solid model, and the other being a project program for carrying out various drawing routines based on the solid model.

Figure 12:
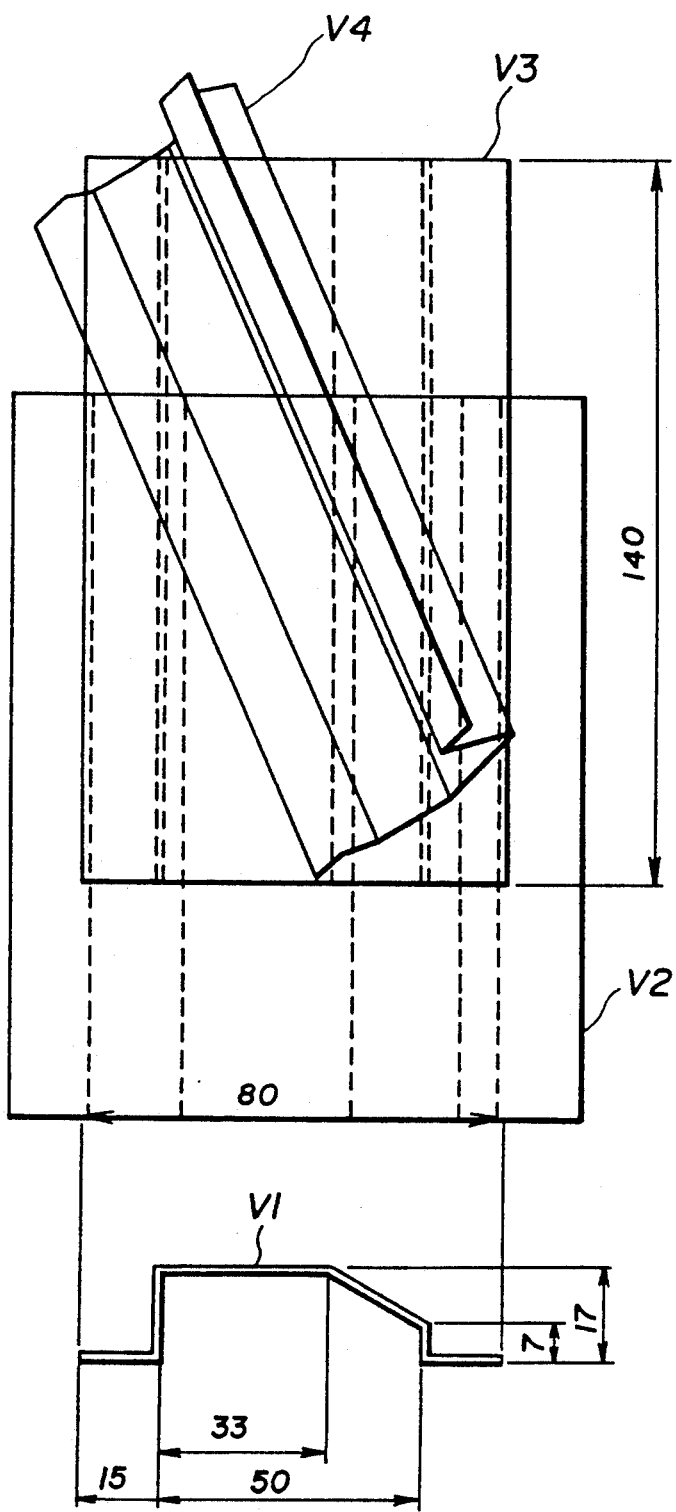
FIGS. 12 through 14 show examples of the outputs obtained by the process shown in FIG. 11.
Figure 13:
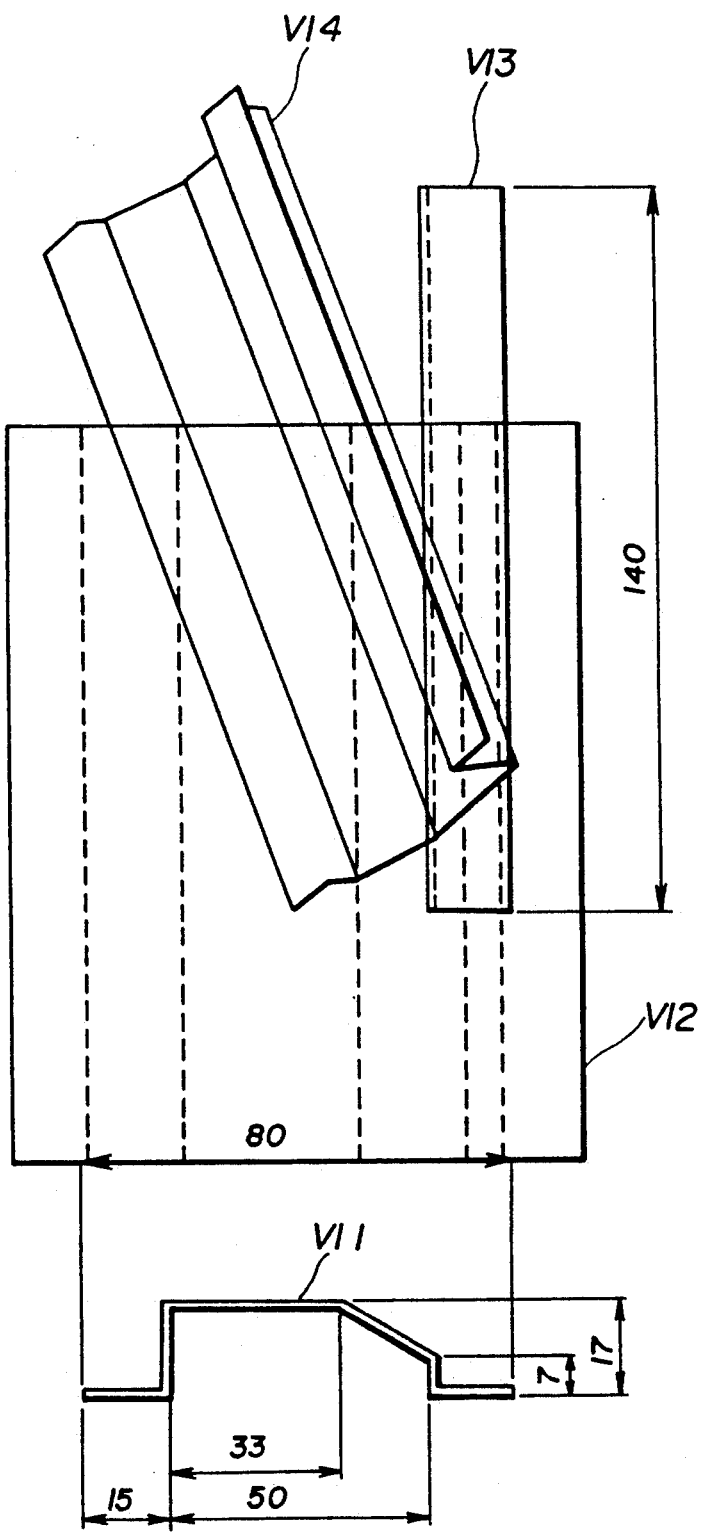
Figure 14:
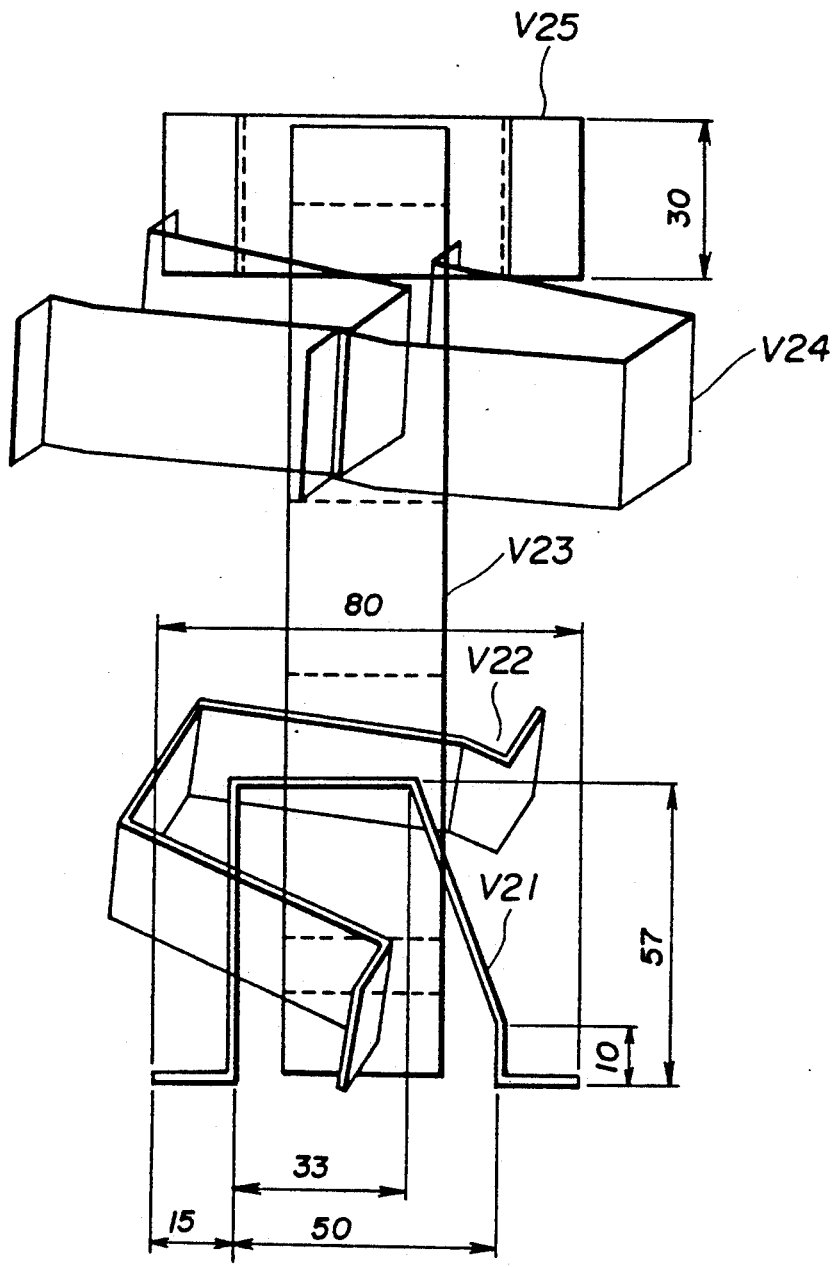

FIGS. 12, 13 and 14 show the outputs obtained at the steps 41, 43 and 46. FIG. 12 shows a bottom view (projection) V1, a development V2, a front view (projection) V3, and a perspective view V4 of an object model derived from the solid 20. FIG. 13 shows a bottom view (projection) V11, a development V12, a side view (projection) V13, and a perspective view V14 of an object model derived from the solid 20. FIG. 14 shows a bottom view (projection) V21, a perspective view V21, a development V23, other perspective views V24, and a front view (projection) V25 of an object model derived from another solid.

The normal projection can be any of six possible normal projections. The normal projection is a drawing which is essentially the same as a hand-written normal projection of the primitive data. Accordingly, it is possible to easily verify the entry by matching with the original drawing. The development is a development pattern having added the correction margin for the bends at the rime when the sheet metal is punched out from a large metal sheet, for example. The perspective view is a projection from an arbitrary point of vision and the processing of the hidden outlines is completely carried out automatically.

In general, the automatic processing of the hidden outlines is extremely difficult to carry out. However, according to the present embodiment, it is possible to first determine the mutual relationship among the unit faces by use of phase data of a vector which is a portion of a normal vector to the surface and the connecting side surface of the unit face with respect to the line of vision, and then process the hidden outlines within the unit face. In other words, the hidden outlines are processed with an algorithm using the shape characteristic peculiar to the sheet metal, and the processing can be carried out at an average speed in the order of 20 seconds on a personal computer.

The following four advantageous features are obtainable according to the present embodiment.

(1) Large degree of freedom of defining the structure and dimension of the model.

(2) Easy modification of the model by a trial-and-error process.

(3) Facilitated conversion of the output into characteristic value, CAM data and drawing.

(4) Small capacity of required of the files.

These features (1) through (4) are all essential conditions for a design data base. The following Table 17 shows the aptitude of the present embodiment, the conventional geometrical model (primitive, wire-frame, etc.) and the conventional normal projection. In Table 17, SA denotes "satisfactory", PO denotes "poor", and (1) through (4) respectively denote the features (1) through (4) above described.

TABLE 17

| Modeling | (1) | (2) | (3) | (4) |
|---|---|---|---|---|
| Present Embodiment | SA | SA | SA | SA |
| Geometrical Model | PO | PO | SA | PO |
| Normal Projection | SA | PO | PO | PO |

The conclusion of Table 17 is obtained for the following reasons.

Firstly, with respect to the feature (1) or structure design and dimension design, the geometrical model does not have the concept of "parts" or constituent elements. In the hand-written normal projection, the "parts" in a multi-level structure are described in the drawn sequence, that is, described time-sequentially. But the "parts" cannot be extracted from the completed normal projection, that is, the deformation process cannot be extracted..

The degree of freedom of dimension design is the freedom with which the solid elements (plan, edge, point) and the dimension value format (distance, angle) may be arbitrarily selected. The normal projection is probabily the only conventional format which can describe the degree of freedom of design. But the normal projection is not an accurate projection in the topological sense because the drawing is described by contour lines, the hidden outlines are omitted, the solid elements are extracted by matching two normal projection patterns, and the like. Actually, there are a plurality of topological structures for one shape, and it is impossible to specify a single structure from the drawing. In other words, the structure cannot be derived uniquely from the drawing.

On the other hand, according to the present invention, it is possible to clearly define as the mapping description the multi-level structure of "parts" which cannot be described by the normal projection. In addition, it is possible to encode the dimension data as a pointer "(part).(solid element)" with respect to the dimension leader line. Therefore, the present invention substantially converts the conventional normal projection into a data base for the automatic modeling.

With regard to the feature (2) or the trial-and-error process, it must be noted that the constructing and modification of the model is made in "parts". Since the normal projection nor the geometrical model has no constituent element parameters, the modification cannot be carried out automatically.

But according to the present embodiment, the modification of the model can be made automatically in accordance with the multi-structure of the "parts". The modification does not affect the upper levels of the tree list but affects all of the lower levels of the tree list.

With respect to the feature (3) or the output function, the present embodiment and the geometrical model are equivalent in this respect because it is possible to make a unique conversion from the geometrical model.

With regard to the feature (4) or the file capacity, the solid model is a transaction and the data base is made up of an extremely small quantity of character data as may be seen from the descriptions of Table 6. For example, the capacity required of the file is considerably small compared to the case where hand-written normal projections such as those shown in FIGS. 10A and 10B are taken as scan data.

Figure 15:
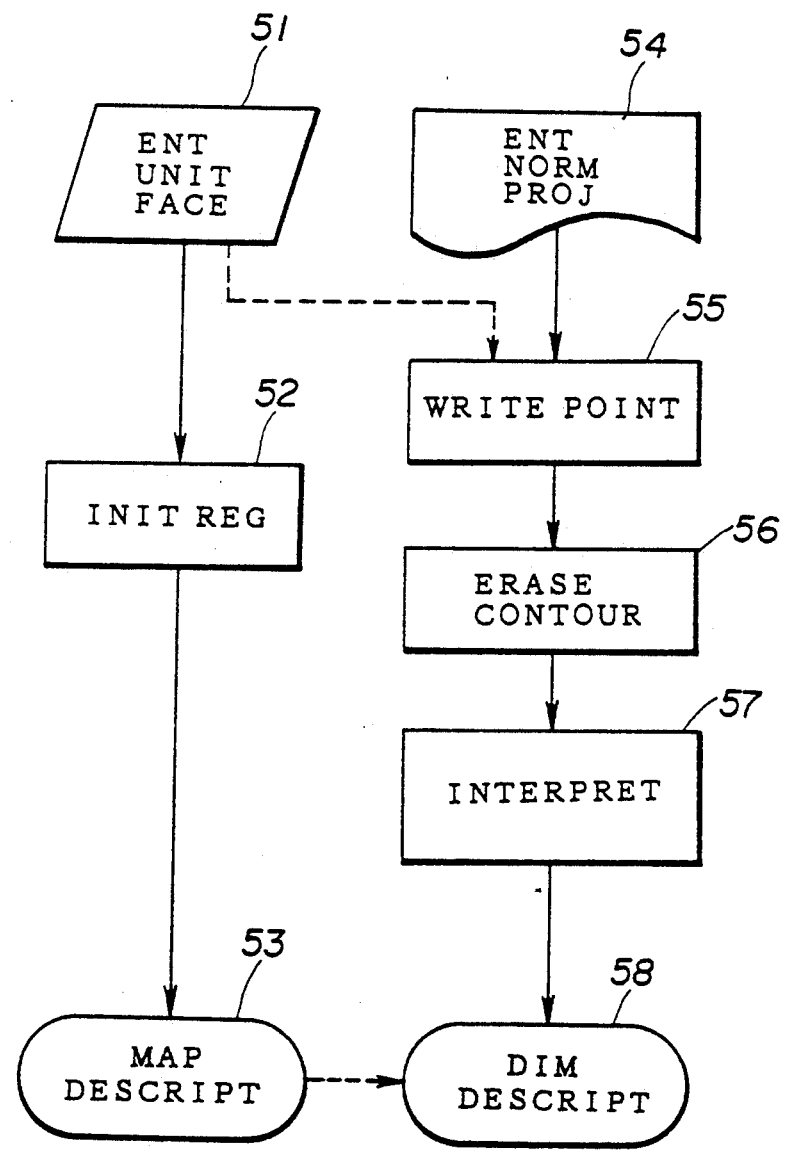
FIG. 15 is a process flow chart for explaining the processes of a second embodiment of the modeling method.

Next, a description will be given on a second embodiment of the modeling method according to the present invention. FIG. 15 is a process flow chart for explaining the initial modeling (drawing recognition) in the second embodiment of the modeling method. In FIG. 15, steps 51 through 53 relate to the shape and structure, and steps 54 through 58 relate to the topological elements.

The step 51 enters the description on the unit faces, and the step 52 initializes the regions of the mapping description and the dimensioning description. The step 53 produces the mapping description. On the other hand, the step 54 enters the normal projection, and the step 55 writes pointers to the dimension leader lines of the normal projection. The step 56 eliminates the contour lines so as to erase the contours (external appearance) from the normal projection. The step 57 interprets the normal projection by defining the relationship of the alphanumeric and numeric sequences (pointer, dimension value) by using the dimension leader lines as guides. The step 58 produces the dimensioning description. The mapping and dimensioning descriptions obtained at the steps 53 and 58 correspond respectively to the mapping description 30 and the dimensioning description 31 shown in FIG. 11. As described before, the mapping and dimensioning descriptions obtained at the steps 53 and 58 can be modified by a trial-and-error process to produce a desired solid model (object model).

In other words, even when the shape and structure of the solid are complex, the present embodiment enables efficient entry of the data describing the solid in terms of the mapping and dimension descriptions.

The normal projection based on the triangular method has a certain degree of freedom of description and is generally considered satisfactory for describing the solid. However, when the normal projection is taken as a medium for entering the solid data into the CAD system and the like, the normal projection lacks the description of the total shape and structure having the shapes of parts of the solid as elements. Furthermore, it is difficult to directly convert the shape pattern in the normal projection into the topological elements (face, edge, vertex, etc.) of the solid.

The present embodiment fully compensates for these deficiencies of the normal projection so that the solid data can be entered efficiently by use of the normal projection. In other words, when entering the normal projection of the solid into a data processing apparatus by an image reading apparatus, alphanumeric sequences describing the topological elements of the solid are written in correspondence with the dimension leader lines, and in addition, a numerical sequence describing the dimensions of the solid are written in correspondence with and adjacent to the dimensioning lines (but in a plan and the like, the numeric sequence describing the dimensions of the solid are already written thereon, and there is usually no need to write the numeric sequence). Further, input data describing the total shape and structure of the solid as a collection of parts are entered into the data processing apparatus from an input device. The data processing apparatus extracts the dimension leader lines and dimensioning lines from the entered normal projection, recognizes the alphanumeric sequence located in correspondence with and adjacent to the extracted dimension leader line, recognizes the numeric sequence located in correspondence with and adjacent to the extracted dimensioning line, and edits data geometrically describing the solid from the recognized alphanumeric and numeric sequences and the input data from the input device.

Figure 16:
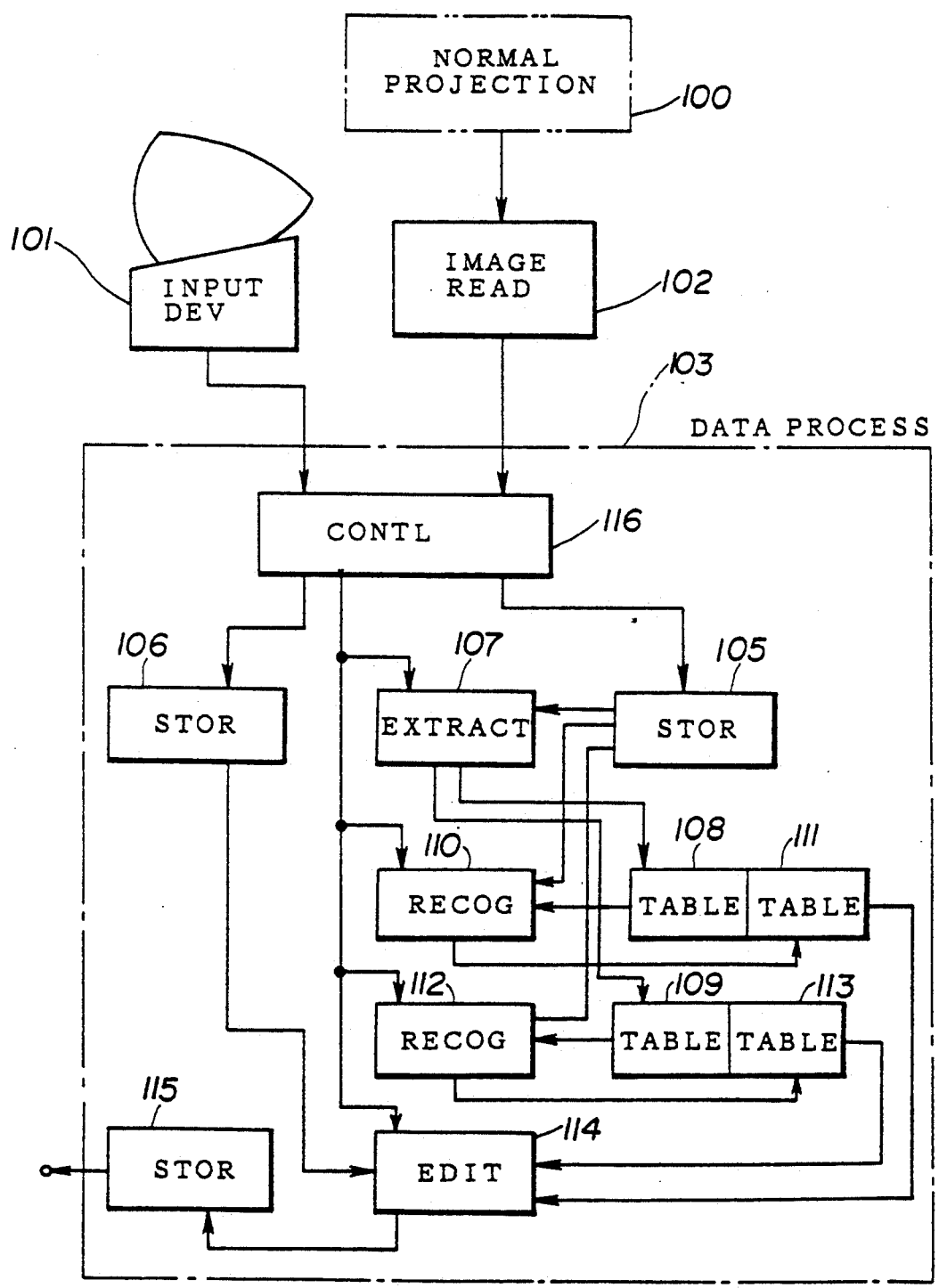
FIG. 16 is a system block diagram showing an essential part of an embodiment of the modeling system according to the present invention applied with the second embodiment of the modeling method.

Next, a description will be given on an embodiment of the modeling system according to the present invention applied with the second embodiment of the modeling method. FIG. 16 shows an essential part of the embodiment of the modeling system. The modeling system generally comprises an input device 101, an image reading apparatus 102, and a data processing apparatus 103. The image reading apparatus 102 reads a normal projection 100 in which the numeric sequence and the alphanumeric sequence of the topological description described before are added, and supplies the read image data to the data processing apparatus 103. When reading the image of the normal projection, it is necessary to eliminate the contour lines describing the external appearance of the solid. The elimination of the contour lines may be carried out directly by tracing the line segments on the input image. However, the process of eliminating the contour lines can be greatly simplified by using different colors to indicate the contour lines of the solid and the dimension leader lines and the dimensioning lines. In this case, the contour lines can be eliminated by use of a filter which passes through only the dimension leader lines and the dimensioning lines depending on the color used therefor. Of course, the contour lines may be erased before the normal projection is read by the image reading apparatus, in which case no such elimination of the contour lines would be necessary.

The input device 101 is used to enter into the data processing apparatus 103 the description data on the total shape and structure of the solid described in the normal projection. For example, the input device 101 comprises a keyboard with a display unit as shown.

The data processing apparatus 103 comprises an image storage part 105, an input data storage part 106, an extracting part 107, a dimension leader line table 108, a dimensioning line table 109, alphanumeric sequence recognition part 110, an alphanumeric sequence table 111, a numeric sequence recognition part 112, a numeric sequence table 113, an editing part 114, a description data storage part 115, and a control part 116.

The image storage part 105 stores the input image data of the normal projection 100 from the image reading apparatus 102, and the input data storage part 106 stores the input data from the input device 101. The extracting part 107 extracts the dimension leader lines and the dimensioning lines in the image data stored in the image storage part 105. The extracted dimension leader lines and dimensioning lines (that is, data indicating their relative positions and directions within the normal projection) are stored in the dimension leader line table 108 and the dimensioning line table 109, respectively. The alphanumeric sequence recognition part 110 recognizes from the input image data stored in the image storage part 105 the alphanumeric sequence added in the vicinity of the dimension leader line in correspondence with the dimension leader line by using the dimension leader line table 108 as a guide. Each dimension leader line (shown in the drawings as a line without arrows) has a predetermined positional relationship with its corresponding alphanumeric sequence. This positional relationship is a function of the drawing rules or method employed to create the drawing. For example, referring to FIG. 10B, the rules can be as follows: (1) the alphanumeric sequences for vertical dimension leader lines extend vertically and are either (a) immediately to the left of the line, as is the case with the left-most vertical dimension leader line and the alphanumeric sequence F2.S1, or (b) in line with and immediately next to the line, as is the case with the alphanumeric sequence F1.B; and (2) the alphanumeric sequences for horizontal dimension leader lines extend horizontally and are either (a) immediately above the line, as is the case with the top-most horizontal dimension leader line and the alphanumeric sequence F0.B, or (b) in line with and immediately next to the line, as is the case with the alphanumeric sequence F2.B.F5.B (note that in FIG. 10B this sequence was written below the dimension leader line to conform to the permitted size of patent drawings, but in an actual drawing used in the invented process it would extend to the right of and in line with its dimension line, as seen in FIG. 17). The process used to determine which alphanumeric sequence is in the vicinity of a dimension line utilizes such a predetermined positional relationship. The dimension leader lines are located using the position and direction data stored in the table 108 as a guide and the alphanumeric sequence, i.e., a sequence that contains both letters and numerals, in the vicinity above the line segment is searched according to the rules such as in the example given above. By this simple method it is possible to recognize corresponding dimension leader lines, i.e., lines which have free ends (without arrows). A similar process is used for the dimensioning lines (the lines ending with arrows) in the drawing, differing only i that the dimensioning lines are recognized as such by the presence of the arrows and the characters in the vicinity of a dimensioning line are only numerals.

Therefore, even if a numeric or an alphanumeric sequence is in the vicinity of two lines or if two numeric or alphanumeric sequences are in the vicinity of a single line, it is possible to identify the correct relationship using the predetermined positional relationship. For example, in FIG. 14, while numbers 33 and 50 are both in the vicinity of the same dimensioning line, only the number 33 is above or to the side of the line and will be determined to correspond to that dimensioning line. The pairing of the line and its corresponding data is dependent not only on the distance between the two items but also on the predetermined positional relationship which is in conformance with the drawing rules or method used. Some numbers (such as 10, 30 and 57 in FIG. 14) may be placed to the side of the dimensioning line to which they correspond if the line is vertical. Although different conventions may be used in different drawings, the convention can be easily ascertained by one of ordinary skill in the art without undue experimentation. Data on the recognized alphanumeric sequence is stored in the alphanumeric sequence table 111 in correspondence with the dimension leader line of the dimension leader line table 108. The numeric sequence recognition part 112 recognizes from the input image data stored in the image storage part 105 the numeric sequence added in the vicinity of the dimensioning line in correspondence with the dimensioning line by using the dimensioning line table 109 as a guide. Data on the recognized numeric sequence is stored in the numeric sequence table 113 in correspondence with the dimensioning line of the dimensioning line table 109. The editing part 114 edits from the input data stored in the input data storage part 106 and the input image data stored in the image storage part 105 the description data which describes the solid both functionally and geometrically, and the description data from the editing part 114 is stored in the description data storage part 115. The control part 116 controls the data input, the flow of data within the data processing apparatus 103 and the operation sequence of each part of the data processing apparatus 103.

For example, FIG. 17 attached hereto is obtained by eliminating the contour lines shown in FIG. 10B (and placing the numeric and alphanumeric sequences as they would actually appear in an exemplary drawing used in practicing the invention, and using small case letters instead of capital letters). To eliminate the contour lines, a different color can be used for the contour lines in a drawing so that the contour lines can be filtered by a color filter when copying the drawing, or a transparent paper is placed on the contour drawing and the transparent paper is removed after writing in the numeric and alphanumeric sequences and drawing the dimension leader and dimensioning lines. As earlier noted, there are two kinds of line segments and corresponding character sequences. One is the "dimension leader line" which extends from a concerned part of the contour drawing. The other is the "dimensioning line" which indicates the distance between a pair of dimension leader lines.

The present invention does not require a special system for character recognition and line segment recognition. Existing recognition systems can be employed, using the following conventions or additions thereto:

1) The dimension leader line is a line segment, i.e., (—) having free tip ends;

2) The dimensioning line is a line segment, having tip ends with arrows, i.e., (←——→);

3) The pointer with respect to the dimension leader line and the dimension value with respect to the dimensioning line exist along the respective line segments in a specific direction and at a specific position; and 4) The characters are only alphanumerals in the case of a dimension leader line and only numerals in the case of a dimensioning line, thereby making the identification relatively simple.

In FIG. 18, a step SP1 cuts out the projection planes, so as to separate the front view, the bottom view, and other views. A step SP2 carries out a first dimension line process and a second dimension line process for the vertical direction, e.g., a first process for the dimension leader lines (the lines without arrows) and a second process for the dimensioning lines (the line with arrows). Similarly, a step SP3 carries out the corresponding first and second dimension line processes for the horizontal direction. Thus, these steps SP2 and SP3 interpret the dimension leader lines and the dimensioning lines for the unit projection plane, and obtain Tables such as tables TA and TB set forth below.

Referring to FIG. 19 for greater detail, the figure illustrates a first dimension line process in which step SP11 detects line segments with free tip ends (without arrows). The process assigns a number to a detected line segment, searches for the characters above or to the side of the line segments from a starting to a finishing point in a scanning direction from left to right. The process at step SP12 collects and records the line segment number, the character sequence and the start and end points after the identification. As a result, Table TA is obtained and stored.

Referring to FIG. 20 for additional detail, the figure illustrates a process which at step SP21 interprets this Table TA. This step SP21 searches for an arrow at the starting end of a dimensioning line, i.e., (←—) and, after detecting this starting end arrow, detects the arrow at the finishing end (→) by following the dimensioning line. In addition, step SP22 obtains Table TB which is set out below by collating the end position and the coordinates of the Table TA.

TABLE TA

| Dimension Leader Line No. | Point Character Sequence | Start & End Points |
|---|---|---|
| P1 | f2.s | Ps1, Pe1 |
| P2 | f2.(h1 + h2) | Ps2, Pe2 |
| P3 | f1.B | Ps3, Pe3 |
| P4 | f3.i | Ps4, Pe4 |
| P5 | f4.B | Ps5, Pe5 |
| P6 | f5.(h1 + h2) | Ps6, Pe6 |
| P7 | f5.S1 | Ps7, Pe7 |

TABLE TB

| Start | End | Dimension Value Character Sequence |
|---|---|---|
| P1 | P7 | 80 |
| P1 | P2 | 7 |
| P1 | P3 | 15 |
| P2 | P6 | 66 |
| P3 | P4 | 33 |
| P3 | P5 | 50 |

With regard to character recognition, the disclosed system need not use a character recognition system designed uniquely for use in the invention. Several character recognition systems have been proposed and several are believed to be in use, including systems for recognizing hand-written characters. Any suitable example of such known character recognition systems can be employed in the present invention. Japanese Laid-Open Patent Applications No. 3-113585 and 3-116393 are examples of such systems, and such systems are discussed in Kahan, S., Pavlidis, T. and Baird, H. S., "ON THE RECOGNITION OF PRINTED CHARACTERS OF ANY FONT AND SIZE," IEEE Transactions On Pattern Analysis and Machine Intelligence, Vol. PAMI-9, No. 2. Mar. 1987. Said patent applications and article are hereby incorporated by reference. The present invention can operate with the less sophisticated types of such character recognition systems, since in the disclose system:

1] Only letters and numbers need to be recognized; and
2] The dimensioning lines and the dimension leader lines and the arrows can be used as a very effective guide when retrieving the position and direction of characters.

Next, a description will be given on the operation of the system shown in FIG. 16 for the case where the the data on the solid 20 shown in FIGS. 10A and 10B are entered. As described before, FIG. 10A shows the front view (projection) and FIG. 10B shows the bottom view (projection) of the solid 20.

When entering the data on the solid 20, the alphanumeric sequences describing the topological elements are written in correspondence with the dimension leader lines of the normal projection beforehand as shown. In addition, the dimension values are written in correspondence with the dimensioning lines. FIGS. 10A and 10B also shown the label names of the unit faces, but the label names are merely shown to facilitate the understanding thereof and are not written in the actual normal projections.

When entering the data on the solid, the normal projections written with the alphanumeric sequences and the numeric sequences are read by the image reading apparatus 102. The normal projections read by the image reading apparatus 102 are stored in the image storage part 105 under the control of the control part 116.

The description data on the total shape and structure of the solid are entered by the input device 101 in accordance with the rule defined in Table 1 described before. The following input data are entered in this embodiment.

F0

F1>F2=F0.0

F3>F4>F5=F0.2

The above input data from the input device 101 are stored in the input data storage part 106 under the control of the control part 116.

The entry of the input image data from the image reading apparatus 102 and the entry of the input data from the input device 101 may be made in an arbitrary order, and it does not matter which entry is made first.

After the entries are made to the data processing apparatus 103 from the input device 101 and the image reading apparatus 102, the data processing apparatus 103 carries out the following processes responsive to an instruction received by the control part 116 from the input device 101, for example.

Under the control of the control part 116, the extracting part 107 scans the normal projection stored in the image storage part 105 and extracts the dimension leader lines and the dimensioning lines in the normal projection. The data on the extracted dimension leader lines and the dimensioning lines (that is, the data on the relative positions and directions within the normal projection) are respectively registered in the dimension leader line table 108 and the dimensioning line table 109.

When the extracting process of the extracting part 107 is ended, the alphanumeric sequence recognition part 110 is started by the control part 116. Under the control of the control part 116, the alphanumeric sequence recognition part 110 refers to the data on the dimension leader lines registered in the dimension leader line table 108, and extracts and carries out a character recognition of the alphanumeric sequences by scanning the input image data in the vicinities of the dimension leader lines. The data on the recognized alphanumeric sequences are registered in the alphanumeric sequence table 111 in correspondence with the dimension leader lines in the vicinities thereof.

When the recognition process on the alphanumeric sequences is ended, the control part 116 starts the numeric sequence recognition part 112. Under the control of the control part 116, the numeric sequence recognition part 112 refers to the data on the dimensioning lines registered in the dimensioning line table 109, and extracts and carries out a character recognition of the numeric sequences by scanning the input image data in the vicinities of the dimensioning lines. The data on the recognized numeric sequences are registered in the numeric sequence table 113 in correspondence with the dimensioning lines in the vicinities thereof.

When the recognition process on the dimensioning lines ends, the control part 116 starts the editing part 114. Under the control of the control part 116, the editing part 114 reads the input data from the input data storage part 106, reads the data on the alphanumeric sequences and the numeric sequences from the respective tables 111 and 113, and carries out an editing process on the read data. The editing part 114 produces description data describing the solid functionally and geometrically, and the description data are stored in the description data storage part 115.

The description data is made up of the mapping portion and the dimensioning portion. The mapping portion corresponds to the input data from the input device 101. The following data are in the dimensioning portion.

FRT.E

140=F0.(S3; S1)

112; 14=(F2, F5).(H1; H2); *

FRT.P

@4_HOLE(6)=(F2, F5).(H1, H2)

BOT.N

80=F2.S1; F5.S1

7; 66=*; (F2; F5).(H1, H2)

BOT.S

15; 50@.5., 0=*; F1.B; F4.B

33=F1.B; F3.IR

BOT.E

17=F0.B; (F2, F5).B

7=F4.IR; *

The meanings of the codes used above were described before in conjunction with the first embodiment of the modeling method, and a description thereof will be omitted.

The description data describes the functional characteristics of the solid by the mapping portion and describes the geometrical characteristic of the solid by the dimensioning portion. Accordingly, it is possible to efficiently enter the solid data for use in three-dimensional processing in the CAD system and the like even when the total shape and structure of the solid are complex.

Further, the present invention is not limited to these embodiments, but various variations and modifications may be made without departing from the scope of the present invention.

What is claimed is:

1. A modeling method for a modeling system capable of designing an object model, said modeling method comprising causing the modeling system to carry out the steps of:
conceptual designing in which functional elements including structure and shape of a solid are described as a combination of unit parts with reference to the shape and connections thereof without entering dimension data and
detailed designing in which geometrical elements including dimensions of the solid are described by coded topological elements in a normal projection of the solid without entering shape data, said coded topological elements being coded according to a predetermined sequence which is dependent on a direction in the normal projection so as to include a sequential number in the code,
said conceptual designing being carried out with respect to the solid in its entirety before said detailed designing.

2. A modeling method as claimed in claim 1 in which said unit parts comprise a main unit part and unit parts, said conceptual designing describing the solid in terms of the main unit part and the unit parts connected thereto, and said coded topological elements including a code portion which refers to the main unit or to the unit parts.

3. A modeling method as claimed in claim 2 in which said main unit part is a first defined face and in which said unit parts include at least one of a flange, a cutout and a hole.

4. A modeling method as claimed in claim 3 in which said step of conceptual designing comprises making a drawing of the solid.

5. A modeling method as claimed in claim 1 in which said detailed designing describes the geometrical elements of the solid by the coded topological elements which are in one of three normal projections respectively showing top, front and side views of the solid.

6. A modeling method as claimed in claim 5 in which said coded topological elements describe the geometrical elements of at least a face, an edge and a vertex of the solid in the normal projection.

7. A modeling method as claimed in claim 5 in which the normal projection includes dimension leader lines, said coded topological elements being written in the normal projection in correspondence with each of the dimension leader lines as pointers thereof for encoding dimension data on the solid.

8. A modeling method for a modeling system capable of designing an object model, said modeling method comprising causing the modeling system to carry out the steps of:
conceptual designing in which functional elements including structure and shape of a solid are described by constituent element parameters with reference to the shape and connections of a combination of unit parts making up the solid; and
detailed designing in which geometrical elements including dimensions of the solid are described by geometrical element parameters,
said solid being described in terms of composite parameters made up of the constituent element parameters and the geometrical element parameters,
said geometrical element parameters being coded topological elements in a normal projection of the solid, said coded topological elements being coded according to a predetermined sequence which is dependent on a direction in the normal projection so as to include a sequential number in the code.

9. A modeling method as claimed in claim 8 in which said coded topological elements describe the geometrical element parameters of at least a face, an edge and a vertex of the solid in the normal projection.

10. A modeling method as claimed in claim 8 in which the normal projection includes dimension leader lines, said coded topological elements being written in the normal projection in correspondence with each of the dimension leader lines as pointers thereof for encoding dimension data on the solid.

11. A modeling method for designing an object model, said modeling method comprising the steps of:
  entering data related to a solid as a data base:
  conceptual designing in which functional elements including structure and shape of the solid are described based on the data base with reference to the shape and connections of a combination of unit parts making up the solid; and
  detailed designing in which geometrical elements including dimensions of the solid are described based on the data base;
  said conceptual designing describing the solid as a connection of unit parts.
  said step of entering data on the solid comprising the substeps of extracting dimension leader lines and dimensioning lines in a normal projection of the solid, recognizing coded topological elements, coded according to a predetermined sequence which is dependent on a direction in the normal projection as to include a sequential number in the code, written in vicinities of corresponding extracted dimension leader lines in the normal projection, recognizing dimension data written in vicinities of corresponding extracted dimension leader lines in the normal projection, recognizing dimension data written in vicinities of corresponding extracted dimensioning lines in the normal projection, and describing the solid as mapping and dimensioning descriptions based on the recognized coded topological elements and dimension data and input data describing shape and structure of the solid as a whole.

12. A modeling method for designing an object model, said modeling method comprising the steps of:
  entering data related to a solid as a data base:
  conceptual designing in which functional elements including structure and shape of the solid are described based on the data base with reference to the shape and connections of a combination of unit parts making up the solid;
  detailed designing in which geometrical elements including dimensions of the solid are described based on the data base; and
  said conceptual designing describing the solid as a combination of unit parts,
  said step of entering data on the solid comprising the substeps of extracting dimension leader lines and dimensioning lines in a normal projection of the solid, recognizing coded topological elements, coded according to a predetermined sequence which is dependent on a direction in the normal projection as to include a sequential number in the code, written in vicinities of corresponding extracted dimension leader lines in the normal projection, recognizing dimension data written in vicinities of corresponding extracted dimensioning lines in the normal projection, and describing the solid as mapping and dimensioning descriptions based on the recognized coded topological elements and dimension data and input data describing shape and structure of the solid as a whole,
  said normal projection of the solid being entered from an image reading apparatus which reads the normal projection written with the dimension leader lines and dimensioning lines,
  said input data describing shape and structure of the solid as a whole being entered from an input device.

13. A modeling method as claimed in claim 12 in which said step of entering data on the solid comprises a further substep of eliminating contour lines of the solid in said normal projection read by the image reading apparatus.

14. A modeling method for designing an object model, said modeling method comprising the steps of:
  entering data related to a solid as a data base;
  conceptual designing in which functional elements including structure and shape of the solid are described based on constituent element parameters of the data base with reference to the shape and connections of a combination of unit parts making up the solid; and
  detailed designing in which geometrical elements including dimensions of the solid are described based on geometrical element parameters of the data base,
  said solid being described in terms of composite parameters make up of the constituent element parameters and the geometrical element parameters,
  said geometrical element parameters being coded topological elements in a normal projection of the solid,
  said step of entering data on the solid comprising the substeps of extracting dimension leader lines and dimensioning lines in the normal projection of the solid, recognizing coded topological elements, coded according to a predetermined sequence which is dependent on a direction in the normal projection as to include a sequential number in the code, written in vicinities of corresponding extracted dimension leader lines in the normal projection, recognizing dimension data written in vicinities of corresponding extracted dimensioning lines in the normal projection, and describing the solid as mapping and dimensioning descriptions based on the recognized coded topological elements and dimension data and input data describing shape and structure of the solid as a whole.

15. A modeling method as claimed in claim 14 in which said normal projection of the solid is entered from an image reading apparatus which reads the normal projection written with the dimension leader lines and dimensioning lines, and in which said input data describing shape and structure of the solid as a whole are entered from an input device.

16. A modeling method as claimed in claim 15 in which said step of entering data on the solid comprises a further substep of eliminating contour lines of the solid in said normal projection read by the image reading apparatus.

17. An input system for entering data on a solid for a modeling system which designs an object model, said input system comprising:
  an image reading apparatus for entering an input image data by reading a normal projection of the solid, said normal projection including dimension leader lines and dimensioning lines;
  an input device for entering input data related to shape and structure of the solid as a whole; and
  a data processing apparatus supplied with the input image data from said input device for producing descriptions which functionally and geometrically describe the solid,
  said data processing apparatus comprising extracting means for extracting the dimension leader lines and the dimensioning lines from the input image data, recognizing means for recognizing from the input image data coded topological elements, coded according to a predetermined sequence which is dependent on a direction in the normal projection so as to include a sequential number in the code, written in vicinities of corresponding dimension leader lines extracted by said extracting means and for recognizing from the input image data dimension data written in vicinities of corresponding dimensioning lines extracted by said extracting means, and editing means for editing the topological elements and the dimension data recognized by said recognizing means and the input data from said input device into said descriptions.

18. An input system as claimed in claim 17, which further comprises means for eliminating contour lines of the solid in said normal projection read by said image reading apparatus.

19. An input system as claimed in claim 17 in which said coded topological elements describe at least a face, an edge and a vertex of the solid in the normal projection.

* * * * *